C. Plaisted.
Hay-Rake & Loader.
N° 73460          Patented Jan. 21, 1868.
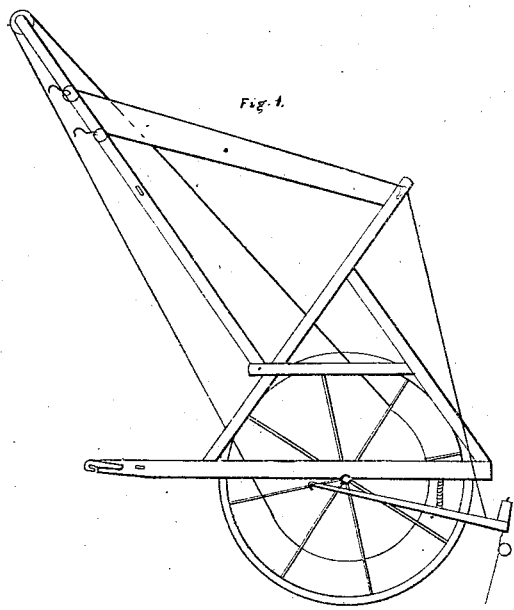
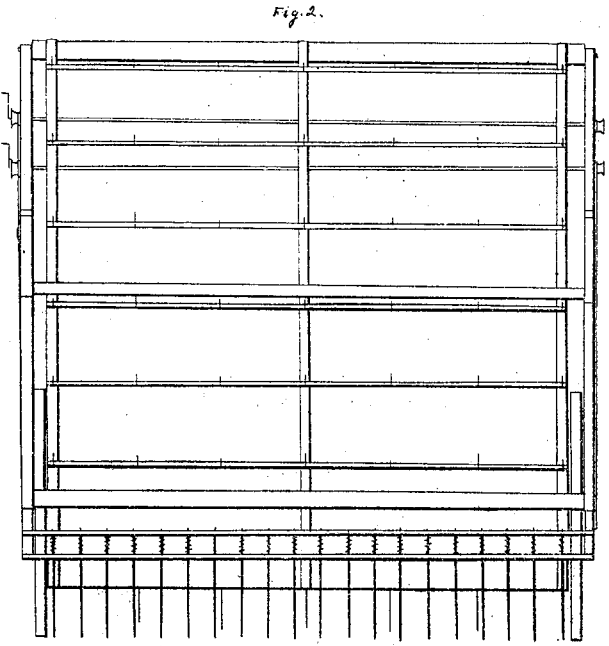
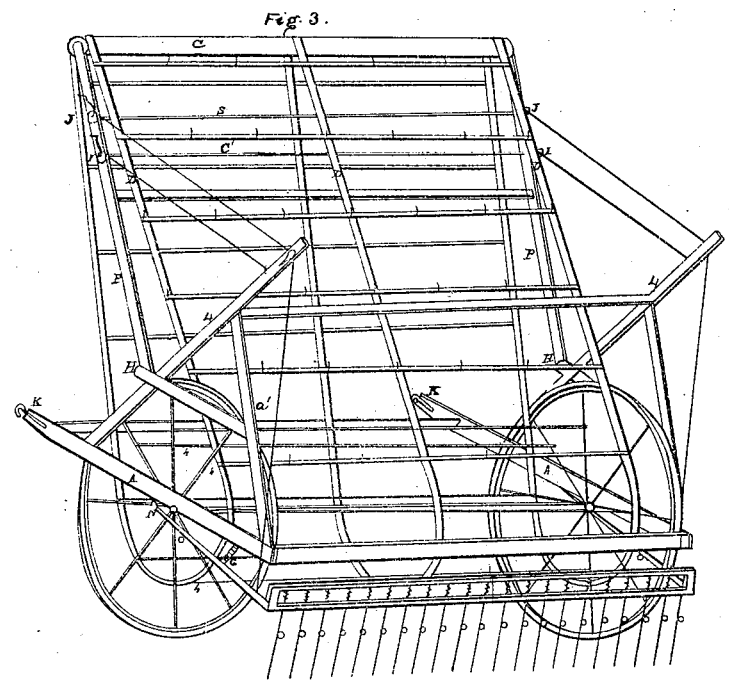
Inventor
Caleb Plaisted

United States Patent Office.

CALEB PLAISTED, OF KENOCKEE, MICHIGAN.

Letters Patent No. 73,460, dated January 21, 1868.

---

IMPROVEMENT IN HAY-RAKERS AND LOADERS.

---

*The Schedule referred to in these Letters Patent and making part of the same.*

---

Be it known that I, CALEB PLAISTED, of Kenockee, in the county of St. Clair, and State of Michigan, have invented a new and useful Machine for Raking and Elevating Hay, Grain, &c.; and I do hereby declare that the following is a full, clear, and exact description of the construction and operation of the same, reference being had to the accompanying drawings, and to letters of reference marked thereon, the same being a part of this specification, in which—

Figure 1 is a longitudinal elevation,

Figure 2, a transverse section, and

Figure 3 a perspective view.

A, frame of rake and elevator; B B are wheels, which carry the machine, and are fastened to a movable axle. These wheels are of such diameter as to allow them to work inside the frame A. 4 is a standard, fastened at the lower end to frame A, and supported in its position by brace $a'$. P are arms, fastened to standards 4 by means of a bolt, as at H, so the top can be raised or lowered at will. C is a long pulley, placed at the top of arms P. D are belts, which pass over the pulleys C and $h$. These belts are fastened the proper distance apart by means of strips of wood, $b$. The pulley $h$ is formed by bolting strips of wood upon each corresponding spoke of wheels B B. F F are two pieces of wood, fastened about six inches apart, and form the head of the rake. Into this head are fitted the teeth, which are made of iron, and between the two parts of the head are spiral springs fastened to each tooth, for the purpose of holding them to the ground, and also for allowing them to pass over any obstructions. O O are two braces of wood, fastened at one end to head F, at the other to frame A, as at $n$, by means of a movable joint, for the purpose of allowing the head F to be raised or lowered. C' is a rod, passing through P P, and has a pulley at each end, I I, for the purpose of receiving a cord, which is fastened at one end to standards, 4 4, by means of a crank attached to rod C'. The standards P P can be raised or lowered to suit the height of the load. S is another rod, passing through standards P P, and has corresponding pulleys, J J, on each end, to receive a cord, which cord passes over pulleys at the top of standards 4 4, thence down to the rake-head F. By means of a crank attached to rod S, the operator can raise or lower the rake-head as desired. The slats $b$ are provided with iron teeth, of the desired length. K are hooks, to attach the machine to a wagon. G G are spiral springs, fastened between the frame A and braces O O, for the purpose of holding the head to the ground.

My machine is operated by attaching it behind a wagon by means of hooks K, and by driving the wagon over the hay or grain to be loaded, the grain will be taken from the ground by rake F, and will be taken from rake F by means of teeth in strips $b$, and will be carried over the pulley C, thence upon the wagon, motion being given to the belts D by the pulley $h$.

Having thus described my invention, what I claim as new and useful, and desire to secure by Letters Patent of the United States, is—

The standards P P, in connection with rods C' and S, and with the pulleys I I and J J.

CALEB PLAISTED.

Witnesses:
    J. D. CARLETON,
    R. S. PATTERSON.